United States Patent [19]

von Boehn, deceased et al.

[11] 4,024,066

[45] May 17, 1977

[54] DRAINAGE DEVICE FOR GRAVEL AND SAND

[75] Inventors: Lothar von Boehn, deceased, late of Rautheim, Germany; by Renate von Boehn born Deichmeier, legal representative, Rautheim; Walter Stichweh, deceased, late of Braunschweig, Germany; by Sabine Stichweh, legal representative; by Petra Stichweh, legal representative; by Inge Stichweh born Sonnabend, legal representative, all of Braunschweig; Stichweh born Sonnabend, legal representative, all of Braunschweig, by Inge Stichweh born von der Schulenburg, legal representative, Halle uber Holzminden, all of Germany

[73] Assignee: Stichweh Verwaltungs-GmbH, Hameln, Germany

[22] Filed: Apr. 23, 1975

[21] Appl. No.: 570,839

[30] Foreign Application Priority Data

Apr. 25, 1974 Germany .......................... 2420493

[52] U.S. Cl. .............................. 210/330; 210/404; 210/406; 210/416 R

[51] Int. Cl.² .................. B01D 33/08; B01D 33/32

[58] Field of Search .......... 210/161, 325, 326, 390, 210/402, 404, 406, 416 R, 330

[56] References Cited

UNITED STATES PATENTS

| 819,179 | 5/1906 | Shortt | 210/404 X |
|---|---|---|---|
| 1,133,944 | 3/1915 | Faber | 210/402 |
| 1,878,998 | 9/1932 | Akins | 210/404 X |
| 2,696,309 | 12/1954 | Bultman | 210/404 |
| 2,765,085 | 10/1956 | Strindlund | 210/402 X |
| 2,899,068 | 8/1959 | King et al. | 210/402 |
| 3,044,629 | 7/1962 | Saxe | 210/404 X |
| 3,220,554 | 11/1965 | Burchert et al. | 210/404 X |

*Primary Examiner*—Frank A. Spear, Jr.
*Assistant Examiner*—Robert H. Spitzer
*Attorney, Agent, or Firm*—Gottlieb, Rackman & Reisman

[57] ABSTRACT

There is disclosed a drainage device for gravel and sand which provides a higher degree of drainage than is obtainable with known drainage devices, consisting of a rotatable bucket wheel, scoop-buckets distributed around the periphery of the bucket-wheel, a chamber and a drainage hole associated with each scoop-bucket, the drainage holes being arranged in a disc-like sidewall of the bucket wheel, and a suction box connected to a vacuum pump and sealingly engaging said side-wall for applying sub-atmospheric pressure successively to each chamber as the bucket wheel rotates.

16 Claims, 8 Drawing Figures

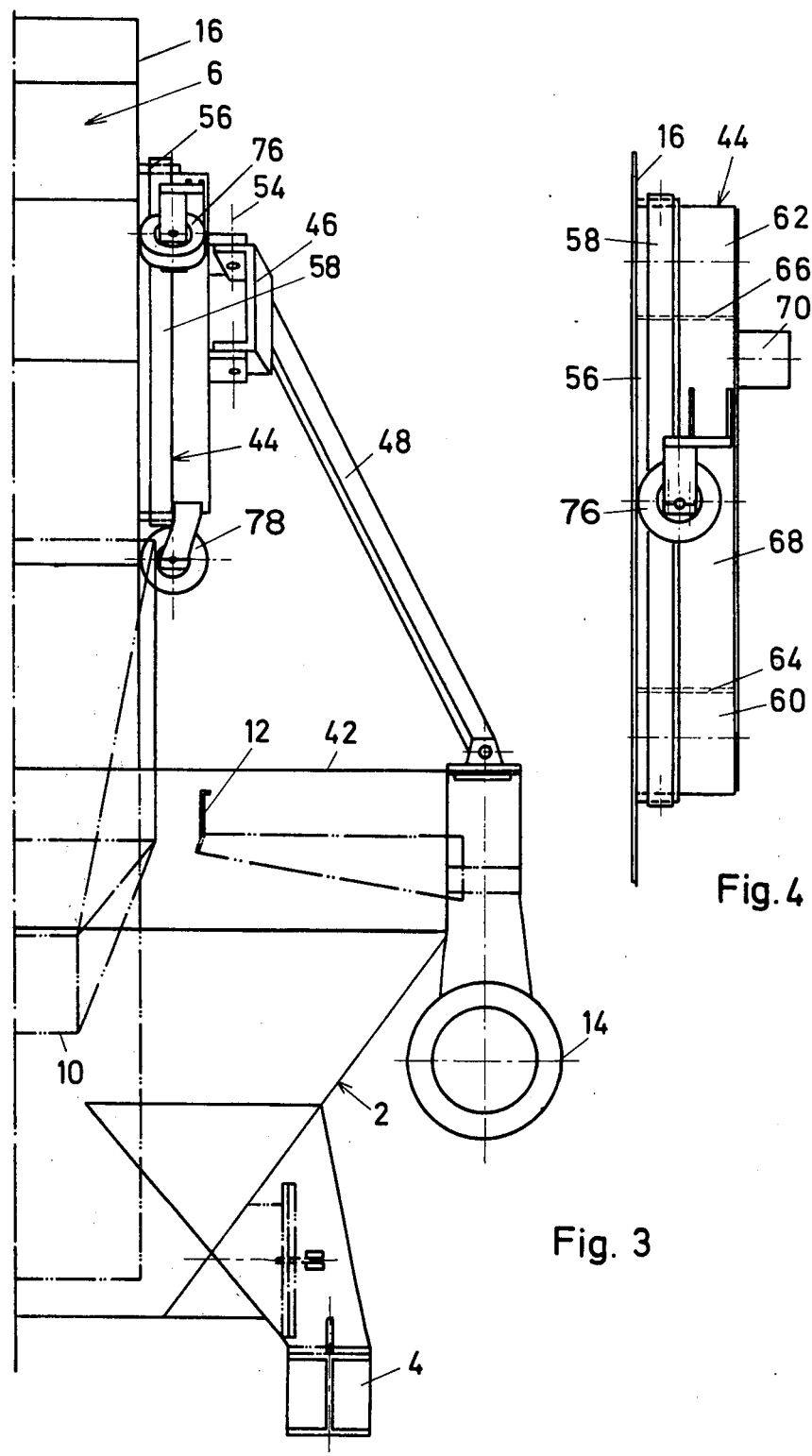

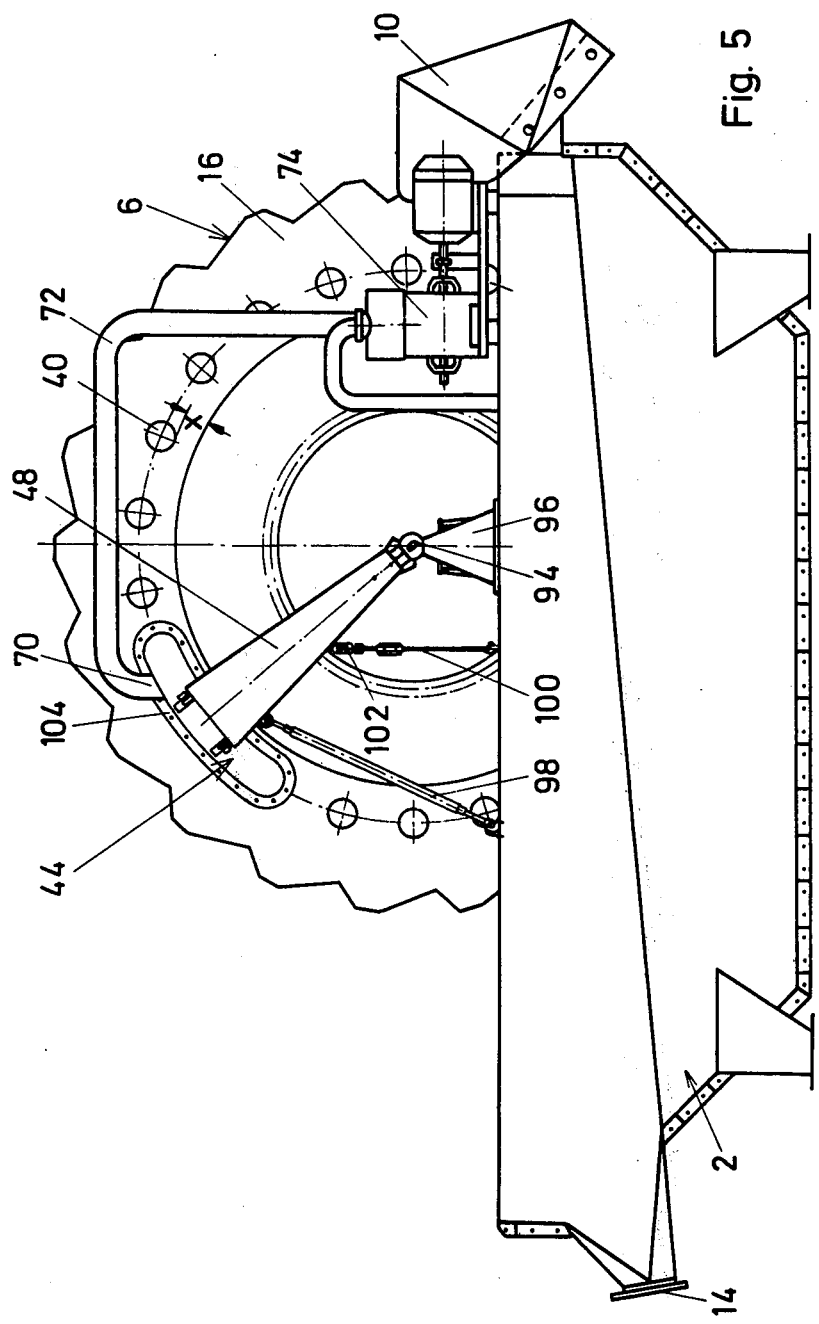

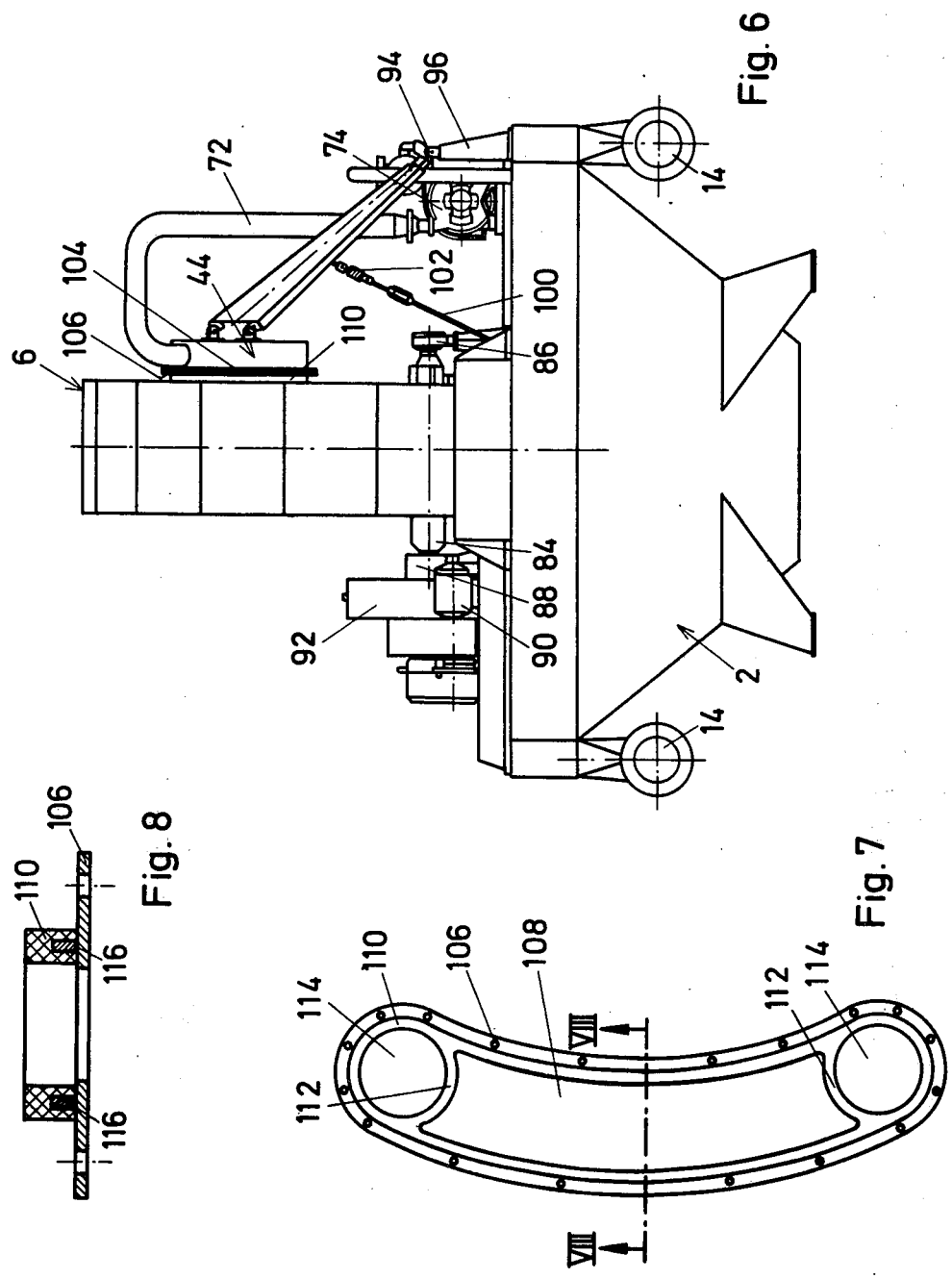

DRAINAGE DEVICE FOR GRAVEL AND SAND

The invention relates to a drainage device for gravel and sand and is particularly concerned with a device of the kind including a bucket wheel dipping into a scooping trough and provided with drive means for rotating the bucket wheel about an axis, scoop buckets distributed around the periphery of the bucket wheel, each scoop bucket being inclined with respect to an associated radius of the bucket wheel whereby the open end of the scoop bucket faces the direction of rotation of the bucket wheel, each said scoop bucket having a mesh-like surface opposite said open end and there being arranged behind each mesh-like surface in the direction of rotation a chamber which is separated sealingly from the adjacent chambers and for which there is provided means for generating a low pressure in the chambers.

In a known device of the foregoing kind, the chambers have towards the centre of the bucket wheel an opening which is arranged in the direction of rotation of the bucket wheel and displace backwards from the scoop bucket for such a distance that, after the emergence of the scoop bucket from the scooping trough, it remains beneath the level of the liquid in the scooping trough for part of the course of the scoop bucket. In this way, between the scoop bucket and the opening, a water column is formed, whereby a certain low pressure is obtained underneath the mesh surface of the scoof bucket, as a result of which it is intended to improve the drainage of the sand or gravel contained in the scoop bucket. The degree of drainage obtainable with devices working on this principle is, however, unsatisfactory.

Vacuum band filters are also known, in which wet sand or gravel is carried over vacuum suction boxes by a conveyor belt pervious to water. However, such vacuum band filters necessitate a preliminary drainage operation.

An object of the invention is to create a drainage device of the aforesaid kind, with which an essentially higher degree of drainage is obtainable than with known drainage devices.

According to the invention a drainage device for gravel and sand includes a bucket wheel dipping into a scooping trough and provided with drive means for rotating the bucket wheel about an axis, scoop buckets distributed around the periphery of the bucket wheel, each scoop bucket being inclined with respect to an associated radius of the bucket wheel whereby the open end of the scoop bucket faces the direction of rotation of the bucket wheel, each said scoop bucket having a mesh-like surface opposite said open end and ther being arranged behind each mesh-like surface in the direction of rotation a chamber which is separated sealingly from the adjacent chambers and for which there is provided means for generating a low pressure in the chambers, and an outlet opening for each chamber defined by a disc-shaped side wall of the bucket wheel on an imaginary circle concentric with the axis of rotation of the bucket wheel, said bucket wheel being rotatable relatively to a suction box which sealingly engages said disc-shaped side wall and is connected to a vacuum pump to enable suction to be applied in turn to said chambers during rotation of said bucket wheel.

Preferably, each of the chambers includes a radially inner wall, and the imaginary circle is of such a diameter that there is a predetemined radial distance between the radially inner wall and the periphery of the associated outlet opening.

The outlet opening of each scoop bucket will preferably be arranged directly underneath its associated mesh surface when the scoop bucket occupies a given rotational position.

The chambers may extend forwardly in the direction of rotation of the bucket wheel beneath the mesh surfaces of the scoop buckets and beyond the outlet openings.

Preferably, the adjacent chambers are separated from each other by transverse walls, each said transverse wall defining a curved portion and adjoining the periphery of the outlet opening of its associated chamber.

The length of the suction box should preferably be such that at least two adjacent outlet openings will be covered by the suction box.

At the ends of the suction box, gaskets are preferably provided, whereby the outlet openings will be sealed against both the atomsphere and a suction chamber of the suction box before the outlet openings enter the suction chamber.

The effective range of the suction box may extend over an arc of approximately 50° to 60°. This range preferably begins, in the direction of rotation of the bucket wheel, approximately 15° to 25° above a horizontal plane containing said axis of rotation.

The suction box is preferably of curved construction.

The suction box may be provided with a gasket arranged sealingly, between the disc-shaped side wall and the suction box. In a preferred embodiment, the gasket is prevulcanised to a flange plate which is connectable detachably to a flange on the suction box adjacent said disc-shaped side wall. Appropriately, the gasket may be provided at each end with an annular section having an effective diameter greater than the diameter of the outlet openings, the annular portion of each section sealingly engaging the flange plate.

The suction box is preferably supported by means of a swivel arm on the scooping trough of the device and, in particular, may be connected to swivel with the swivel arm. One of the joints of the swivel arm is preferably a universal joint.

The suction box may be provided with bogie wheels.

A drainage device in accordance with the invention will now be described by way of example with reference to the accompanying drawings in which:-

FIG. 3 is an end view of the drainage device shown in FIG. 1, as viewed from the left in FIG. 1;

FIG. 4 shows, in the direction of the arrow IV in FIG. 1, a top view of one embodiment of a suction box;

FIG. 5 is a similar to FIG. 1, and illustrates a further embodiment of a drainage device in accordance with the invention;

FIG. 6 shows an end view of the drainage device according to FIG. 5, as viewed from the left in FIG. 5;

FIG. 7 is a top view of the gasket side of an alternative embodiment of a suction box, and FIG. 8 is a cross-section of the suction box shown in FIG. 7 on the line VIII—VIII in FIG. 7.

Figure 1:
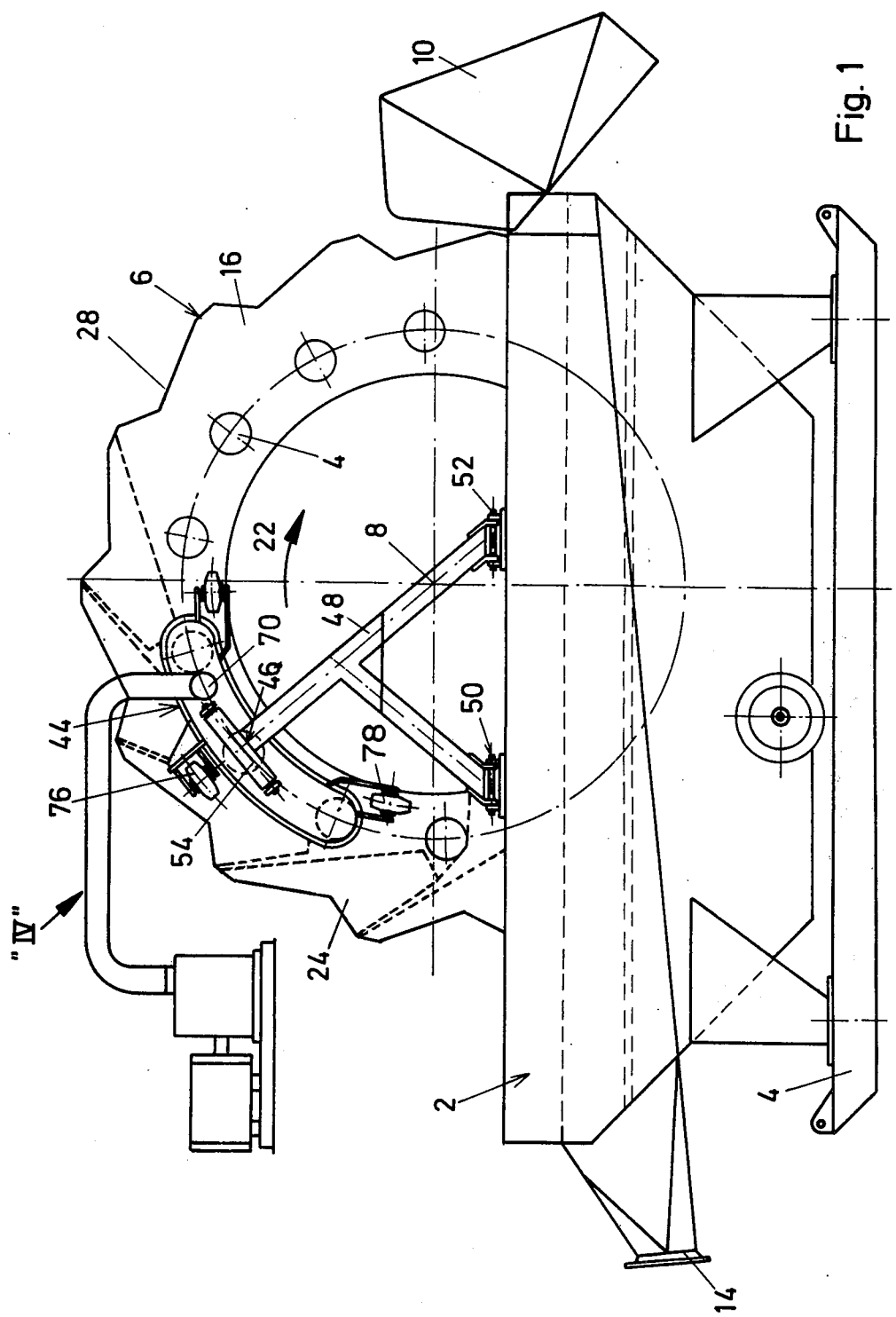
FIG. 1 is a side view of one form of drainage device in accordance with the invention.

The drainage device represented in FIG. 1 has a trough 2 which can be part of a floating pontoon, but can also, as shown in the drawing, be supported on land on skids 4. A bucket wheel 6 is supported by and dips into the trough and is rotatable about an axis 8. The mounting of the bucket wheel and a rotary drive for the bucket wheel are not shown in FIG. 1.

Scoop buckets are distributed over the periphery of the bucket wheel, each scoop bucket being inclined with respect to an associated radius of the bucket wheel whereby the open end of the scoop bucket will face the direction of rotation. The scoop buckets are provided with mesh-like surfaces 30 opposite their open ends (see FIG. 2). A mixture of gravel, sand and water is lifted out of the trough 2 by the bucket wheel, drained during rotation and then released into a discharge hopper 10, under which the feed side of a conveyor belt can be located. The mixture is conveyed into the trough, for example, along a pipeline from a suction dredge. In its upper area, the trough 2 is provided, in known manner, with an overflow weir 12 for the water. Overflowing water runs off through an overflow 14 directly or into a pipeline.

Figure 2:
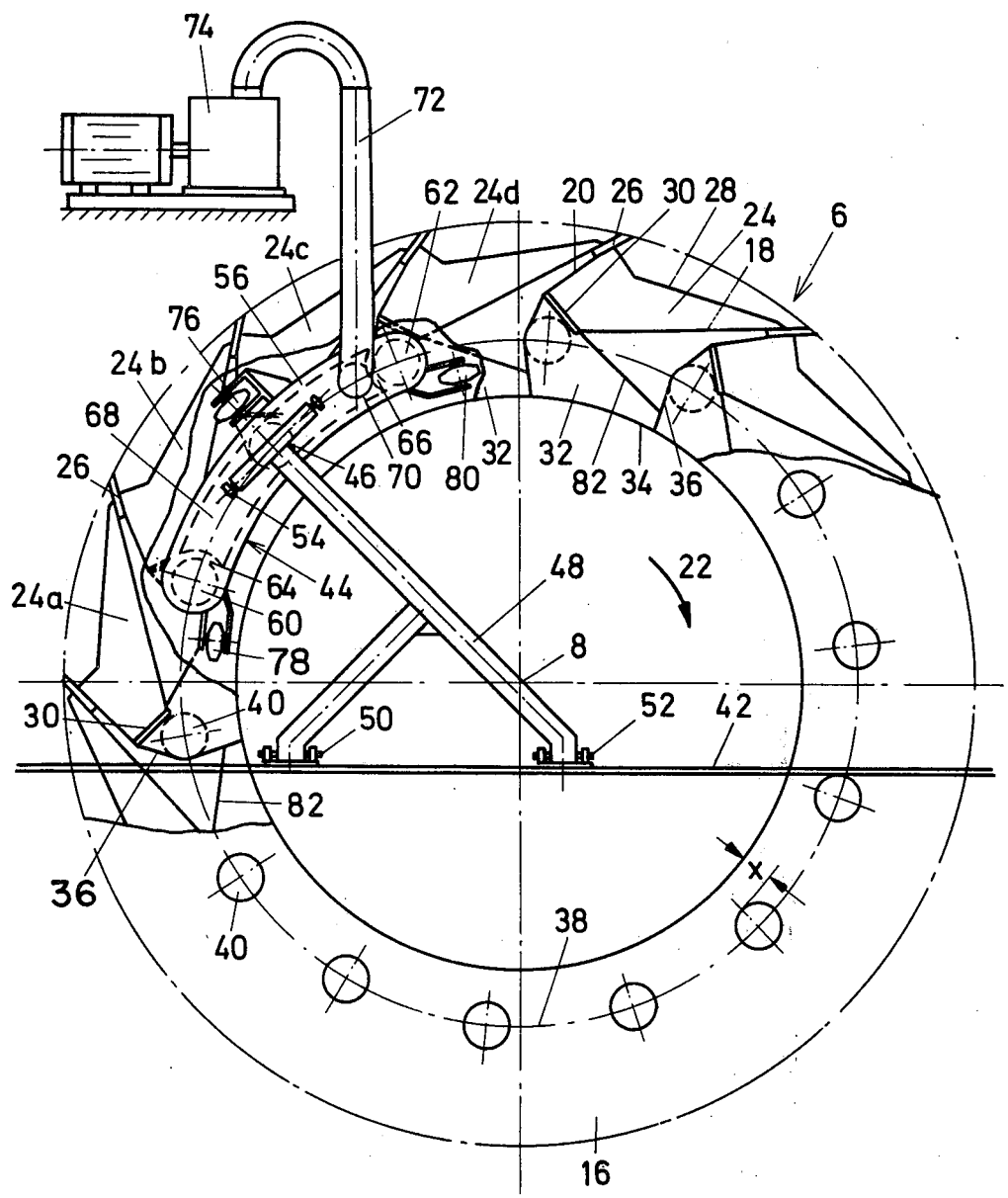
FIG. 2 shows schematically details of a bucket wheel and a suction device for the drainage device shown in FIG. 1.

As seen particularly in FIGS. 2 and 3, the bucket wheel 6 has side walls 16 which, in the embodiments shown, are in the form of annular discs through whose inner opening the inside of the bucket wheel is accessible. Transverse walls 18 and 20 extend between the side walls 16 adjacent the periphery of the bucket wheel, and are each inclined in advance towards an associated radius of the bucket wheel in the direction of rotation of the bucket wheel indicated by the arrow 22. The walls 18 and 20 define front and rear limiting walls respectively of the scoop buckets 24. At the radially outer ends of the walls 18 and 20, wearing blades 26 are provided. The side walls 16 of the bucket wheel form the side walls of the scoop buckets 24. The side walls 16 can also be provided conventionally with wearing blade (not shown). In the area of the individual scoop buckets 24, the side walls of the bucket wheel are provided with indentations 28.

Enclosed chambers 32 are defined radially inwardly of the scoop buckets 24, the chambers being limited on the inside of the wheel by a cylindrical wall 34 welded between the side walls 16. Towards the periphery, the chambers 32 are sealed from each other by walls 36. The walls 36 extend from the inner end of the rear limiting wall 20 of the scoop buckets or from the rear end of the mesh surface of the scoop buckets. They are bent or curved backwards in the direction of rotation of the bucket wheel for reasons which will be described hereinafter.

One of the side walls 16 of the bucket wheel 6 defines openings 40 positioned on an imaginary circle 38 concentric with the axis 8. The diameter of the circle 38, the diameter of the cylindrical wall 34 and the diameter of the openings 40 are so arranged that the openings 40 lie radially at a distance x from the cylindrical wall 34. As shown in FIG. 2, the openings 40 are so arranged that they directly adjoin the mesh surfaces 30 of the scoop buckets 24. Further, the bend or curvature of the walls 36 is so chosen that the bend or curve lies on the imaginary circle 38 in such a way that the wall 36 directly adjoins the opening 40. By this construction of the partition 36 in conjunction with the arrangement of the opening 40, a channel leading through the opening 40 into the open is formed by the wall 36, when the scoop bucket emerges from the scooping trough, the top edge 42 of which is intended to correspond to the level of liquid in the scooping trough. Water which overflows into the chambers through the mesh surfaces can run off directly through the channel. A scoop bucket in this position is indicated in the drawing by reference numeral 24a.

A suction box 44 is arranged adjacent the side wall 16 of the bucket wheel 6, in which the openings 40 are formed. The suction box 44 is hinged by a joint 46 to a supporting arm 48 which, in turn, is hinged by swivel joints 50, 52 on the edge 42 of the scooping trough. The swivel joint 46 is constructed as a universal joint with a first swivel axis 54 at a tangent to the circle 38. The second swivel axis is at right angles to the swivel axis 54 and can be formed by a hinge pin which pivots substantially radially to the axis of rotation of the bucket wheel in a tube at the end of the supporting arm 48. The suction box 44 extends arcuately for a distance corresponding to an arc containing three adjacent openings 40 and so covers a maximum of three of the openings 40, as shown in FIG. 2. The arc extends approximately 50° to 60°. The overlapping of the openings 40 begins approximately 15° to 25° above a horizontal plane containing the axis of rotation 8 of the bucket wheel.

The suction box 44 carries, on its open side facing the side wall 16 of the bucket wheel, a continuous gasket 56 which sealingly engages the side wall 16 and which can be held in place by a continuous clamp 58, as shown in FIG. 4.

To prevent the suction of secondary air through the openings 40, when these openings enter and emerge into and from the suction box 44, sluice valves 60, 62 are provided at the ends of the suction box, which are separated by partitions 64 and 65 from a suction chamber 68 of the suction box 44. The portions of the partitions 64 and 65 adjacent the side wall 16 are also provided with gaskets for sealingly engaging the side wall 16.

The suction chamber 68 lies between the sluice valves 60 and 62. In the area of the suction chamber 68, the suction box 44 is provided with a connection piece 70 which is linked by a pipe 72 to a vacuum pump 74. The vacuum pump 74 may be in the form of a water ring pump.

In the embodiment according to FIGS. 1 to 4, the suction box 44 is provided with three bogie wheels or rollers 76, 78, 80 which have radially directed axes. The rollers 78 and 80 run on a track arranged radially inwardly of the openings 40, and the roller 76 runs on a track arranged radially outwardly of the openings 40. The contact pressure on the gasket is limited by the rollers 76, 78, 80. For the purposes of precision adjustment and re-adjustment, the rollers can be provided with eccentric axles. By means of the universal joint between the suction box and the supporting arm, the placing of the suction box and its gaskets on the outside of the side wall 16 of the bucket wheel is determined exclusively by the adjustment of the rollers.

The drainage device described operates as follows:

After a scoop bucket 24 filled with sand or gravel and water emerges from the trough 2, the water flows through the sand or gravel in known manner by gravity and enters the chamber 32 through the mesh surface. From this chamber the water then runs off through the side openings 40 along the channel formed by the wall 36. As the bucket wheel continues to rotate, the opening 40 associated with the scoop bucket in question comes under the end, at the rear in the direction of rotation, of the suction box 44 and is sealed by the sluice valve 60 against both the atmosphere and the suction chamber 68. Until the opening has entered the suction chamber completely, the flow of water out of the chamber 32 is forestalled.

As soon as the opening 40 has passed through beneath the wall 64 separating the sluice valve 60 from the suction chamber 68 and is connected to the suction chamber, the low pressure generated by the vacuum pump 74 acts suddenly on the chamber 32, as a result of which the water is sucked into the chamber 32 from the mixture of sand or gravel and water through the mesh surface 30 of the scoop bucket. The low pressure acts during the entire time that the opening 40 is in the area of the suction chamber 68. Hence, in the illustration according to FIG. 2, the chamber 32 belonging to the scoop bucket 24c is subject to the low pressure, while the chambers belonging to the scoop buckets 24b and 24d are sealed by the sluice valves 60 and 62.

Only air is intended to be sucked from the suction chamber 68 by the vacuum pump 74. The water emerging from the scoop buckets collects in the chambers 32. As these chambers extend forwards from the openings 40 in the direction of rotation, a sufficiently large reservoir is available to take the water sucked off. As can be seen in the drawing, the opening is in the top right-hand quadrant of the bucket wheel, in which the discharge of the drained sand or gravel takes place, at any given time at the highest point of the chambers 32. Thus, no water can re-enter the scoop buckets. Emptying of the chambers 32 occurs when the scoop buckets emerge above the level of liquid in the scooping trough.

In the embodiment illustrated, a maximum of two scoop buckets are subject at any given time to the low pressure. It has been shown that the effect of low pressure over about 1/5 to 1/6 of the rotation of the wheel is sufficient to achieve the required drainage. 95% drainage has been obtained with a low pressure of 7 mWS (meters of water column). A longer-lasting low pressure effect has not produced any substantial improvement of this result. Since bucket wheels of this type rotate at one revolution per minute, the low pressure effect lasts between 10 and 20 seconds.

To avoid corners in the chambers 32, in which sand or gravel could become clogged, an additional partition 82 can be provided, leading from the forward end of the mesh surface to the wall 36 of the adjacent forward chamber. In this way, a relatively compact form of the chambers 32 is achieved.

As already mentioned, the length of the suction box must be adapted to the required duration of the low pressure effect. The rear end of the suction box or suction chamber, in the direction of rotation, should be so arranged that underneath a horizontal tangent to the lowest point of the opening 40, there is in the chamber 32 an available volume which can take the maximum amount of water to be expected at any given time, without the water being able to overflow through the opening into the suction chamber. The passage of sand through the mesh surface into the chamber 32 is not critical, at this sand, together with the water running out of the chamber 32, is flushed out again, when the scoop buckets emerge from the scooping trough.

Side walls for the bucket wheels cannot, in practice, be manufactured with diameters up to and above 2 meters without distortion. However, distortion of the side walls, even of the order of centimeters, does not prejudice the action of the devices, as the suction box can adapt itself to the contour of the wall surface by means of the universal joint. This substantially applies also to normal abrasion during operation. Irregularities which can occur through warping due to local weld during welding of the intermediate walls can be more critical. If a sufficiently smooth surface cannot be obtained here, it may be appropriate to apply to the outside of the side wall of the bucket wheel a separate ring as sliding surface for the suction box. Such a ring could be provided, for example, with a rust-proof surface.

The embodiment according to FIGS. 5 and 6 essentially corresponds to the previously described embodiment. In FIG. 6, the axle 84 of the bucket wheel 6 pivots in bearings 86 and 88. Furthermore, the driving motor 90 is illustrated and drives the bucket wheel via a reduction gear 92.

Here, the supporting arm 48 for the suction box 44 is supported in a universal joint 94 in a bracket 96 in a bracket 96 which is arranged on the edge of the scooping trough. Furthermore, a stay 98 is hinged on the supporting arm 48 whereby the supporting arm and so the suction box will be braced in the direction of rotation of the bucket wheel. The position of the suction box can also be adjusted by means of the stay 98. The suction box is held in place on the side wall of the bucket wheel by a rod 100 and a tension spring 102.

Contrary to the embodiment according to FIGS. 1 to 4, the suction box in the embodiment does not have any rollers. Support is provided merely by the gasket on the front end.

Here, the suction box is provided with a continuous flange 104, against which a corresponding flange plate 106 is bolted, the gasket 110 being prevulcanised on the latter. In this way, it is possible to exchange the gasket holder and the gasket connected thereto by loosening the flange unions.

FIG. 7 represents a top view of the gasket 110 on the suction box together with its mounting. The mounting plate for the gasket is constructed so that its periphery is of complementary shape to the flange 104 of the suction box 44. It also has a cut-away portion 108 which essentially corresponds to the area of the suction chamber of the suction box 44. At both ends if the cut-away portion 108 the gasket 110 is provided with a transverse wall 112, so that at both ends approximately circular cavities 114 are formed, which are closed by the mounting plate 106 and which form the aforementioned sluice valves at the ends of the suction box.

As can be seen from the cross-section shown in FIG. 8, the side of the plate 106 carrying the gasket 110 is provided with projections 116 which serve as mounting supports for the gasket. These projections can be studs arranged at intervals. It is also possible, however, to fasten a continuous shaped strip on edge on the mounting plate. Such a shaped strip may have undercuts or may be provided with transverse holes, in order to obtain effective clamping of the gasket material. Mounting studs having heads can be provided for this purpose. The gasket can be cast with the plate 106 as a moulded cover or moulded bottom and, if necessary, prevulcanised. High wear-resistant plastics are preferably used as gasket material, for example, "Vulkollan", an elastic synthetic rubber manufactured by the firm of Bayer AG, Leverkusen, Germany.

With the construction of the suction box and the gasket according to FIGS. 5 to 8, it is possible to change the gasket quickly without difficulty.

It is appropriate to provide at least two rates of revolution for the bucket wheel, in order to obtain uniform drainage conditions, and uniform filling of the scoop buckets. Such an arrangement is also desirable when the delivery of sand or gravel varies or when the proportion of test material varies in the mixture of sand or gravel and water supplied by the suction dredge. For this purpose, driving motors in the form of motors with commutable poles are preferably used. The speed of the motors can be commuted depending on the consumption of the motors, since consumption is dependent on the proportion of solid material. If the proportion of solid material drops and with it the power consumption of the motor below a specific value, the motor automatically switches to a lower speed. Hence, maximum speed is used when the bucket wheel is fully loaded. Of course, manual control can be provided in addition to the automatic control.

Having now particularly described and ascertained said invention and in what manner the same is to be performed it is declared that what is claim is:

1. A drainage device for gravel and sand including (a) a bucket wheel dipping into a scooping trough and provided with (i) drive means for rotating the bucket wheel about an axis, said wheel having two side walls and one inner wall spaced radially from the axis of rotation, (ii) a plurality of scoop buckets distributed around the periphery of the bucket wheel, each of said scoop buckets being inclined whereby the open end of each of said scoop buckets faces the direction of rotation of the bucket wheel, each of said scoop buckets having a mesh-like surface opposite said open end, (iii) a plurality of chambers, each corresponding to one of said scoop buckets, each of said chambers being arranged radially inwardly of the corresponding mesh-like surface and communicating only with said corresponding mesh-like surface, and (iv) a plurality of outlet openings located in one of said walls of the bucket wheel, each of said outlet openings having the same distance from and being arranged on a circle concentric with the axis of rotation of the bucket wheel, each of said outlet openings corresponding to one of said chambers and communications only with said corresponding chamber, the device further comprising a non-rotating suction box located above a horizontal plane containing the axis of rotation of the bucket wheel for sealing engagement with said wall in which said outlet openings are located, and (c) a vacuum pump connected to said suction box to enable suction to be applied sequentially to said chambers during rotation of said bucket wheel, said outlet openings defining a path of travel during rotation of said bucket wheel, said path of travel comprising a first arcuate portion prior to said sealing engagement and permitting partial drainage of said chambers through said outlet openings under the influence of gravity, and a second arcuate portion for effecting sequential alignment of said outlet openings with said suction box to complete said drainage during said sealing engagement, said suction box having leading and trailing segments and a suction chamber therebetween, and being provided with at least one gasket to seal said outlet openings and said segments to prevent communication between said suction chamber and the atmosphere when each of said outlet openings is aligned with said leading and trailing segments of said suction box, each of said segments defining with said at least one gasket respective entrance and exit ports, each of said ports having an effective diameter greater than the diameter of said outlet openings, and each of said outlet openings passing sequentially from said first arcuate portion to said entrance port and thence past said suction chamber to said exit port during rotation of said bucket wheel.

2. A device according to claim 1 wherein said outlet openings are located in one of said side walls of the bucket wheel, said one of said side walls being formed by a plane disc ring.

3. A device, according to claim 2, in which there is a predetermined radial distance between said inner wall and the periphery of each said outlet opening.

4. A device, according to claim 2, in which each of said outlet openings is arranged directly radially inwardly of said corresponding mesh-like surface.

5. A device, according to claim 2, in which each of said chambers extends forwardly of one of said outlet openings in the direction of rotation of the bucket wheel and radially inwardly of said corresponding mesh-like surface.

6. A device, according to claim 2, in which the suction box is supported on the scooping trough of the device by means of a swivel arm.

7. A device, according to claim 6, in which the suction box is connected by a universal joint to the swivel arm.

8. A device, according to claim 2, in which the suction box is provided with bogie wheels.

9. A device, according to claim 2, further comprising a ring with a rust-proof surface arranged on the side wall of the bucket wheel in which the outlet openings are located.

10. A device, according to claim 2, further comprising a plurality of transverse walls, each of said transverse walls corresponding to one of said chambers to prevent communication between said chambers and having a curved portion adjoining the periphery of the one of said outlet openings communicating only with said corresponding chamber.

11. A device, according to claim 1, in which said suction box covers at least two adjacent outlet openings.

12. A device, according to claim 1, in which said second arcuate portion of said path of travel subtends an angle of 50° to 60°.

13. A device, according to claim 12, in which said first arcuate portion of said path of travel subtends an angle of 15° to 25°.

14. A device, according to claim 1, in which the suction box is arcuate construction.

15. A device, according to claim 1, further comprising a flange on said suction box adjacent said wall of the bucket wheel in which the outlet openings are located and a flange plate detachably connected to said flange, said at least one gasket being prevulcanised to said flange plate.

16. A device, according to claim 15, in which the space within said entrance and exit ports is covered by said flange plate.

* * * * *